US007846504B2

(12) United States Patent
Maier et al.

(10) Patent No.: US 7,846,504 B2
(45) Date of Patent: Dec. 7, 2010

(54) DIE HAVING MULTIPLE ORIFICE SLOT

(75) Inventors: Gary W. Maier, Roberts, WI (US); Mikhail L. Pekurovsky, Bloomington, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/491,378

(22) Filed: Jun. 25, 2009

(65) Prior Publication Data

US 2009/0261499 A1 Oct. 22, 2009

Related U.S. Application Data

(62) Division of application No. 10/217,715, filed on Aug. 13, 2002, now Pat. No. 7,591,903.

(51) Int. Cl.
*B29C 47/02* (2006.01)

(52) U.S. Cl. .................................... 427/356; 118/419

(58) Field of Classification Search ................ 427/356; 118/419

See application file for complete search history.

(56) References Cited

U.S. PATENT DOCUMENTS

| | | | |
|---|---|---|---|
| 3,149,949 A | 9/1964 | Dockerty et al. | |
| 3,256,081 A | 6/1966 | Peyches et al. | |
| 4,106,437 A | 8/1978 | Bartlett | |
| 4,142,010 A | 2/1979 | Pipkin et al. | |
| 4,324,816 A | 4/1982 | Landis et al. | |
| 4,371,571 A | 2/1983 | McIntyre et al. | |
| 4,386,998 A | 6/1983 | McIntyre et al. | |
| 4,391,856 A | 7/1983 | McIntyre et al. | |
| 4,465,015 A | 8/1984 | Osta et al. | |
| 4,774,109 A | 9/1988 | Hadzimihalis et al. | |
| 5,045,358 A | 9/1991 | Watanabe et al. | |
| 5,536,312 A * | 7/1996 | Madrzak et al. | 118/118 |
| 5,567,493 A | 10/1996 | Imai et al. | |
| 5,700,325 A | 12/1997 | Watanabe | |
| 5,720,816 A * | 2/1998 | Li et al. | 118/410 |
| 5,756,163 A | 5/1998 | Watanabe | |

(Continued)

FOREIGN PATENT DOCUMENTS

EP 0 827 783 A1 3/1998

(Continued)

*Primary Examiner*—Michael Cleveland
*Assistant Examiner*—Tabatha Penny
(74) *Attorney, Agent, or Firm*—George W. Jonas; James A. Baker

(57) ABSTRACT

The invention is a die for dispensing flowable material. The die is comprised of a die block. An external face is disposed on the die block. At least one slot extends perpendicularly into the external face. The slot has a longitudinal dimension, a first longitudinal side and a second longitudinal side. At least one support member extends from the external surface into the slot. The support member extends continuously from the first longitudinal side to the second longitudinal side. At least a portion of the support member is disposed in a direction other than perpendicular to the longitudinal dimension. The support member is disposed to such that at least a portion of any plane extending from the first longitudinal side to the second longitudinal side, in a direction perpendicular to the longitudinal dimension of the slot, passes through a void area.

12 Claims, 7 Drawing Sheets

U.S. PATENT DOCUMENTS

| | | | | |
|---|---|---|---|---|
| 5,769,947 | A * | 6/1998 | Krappweis | 118/411 |
| 5,871,585 | A | 2/1999 | Most et al. | |
| 6,040,016 | A | 3/2000 | Mitani et al. | |
| 6,467,893 | B1 | 10/2002 | Matsumoto et al. | |
| 6,537,376 | B1 | 3/2003 | Yasui et al. | |
| 6,695,923 | B1 | 2/2004 | Schultz et al. | |
| 7,749,565 | B2 * | 7/2010 | Johnson et al. | 427/271 |
| 7,752,995 | B2 * | 7/2010 | Tremblay et al. | 118/301 |

FOREIGN PATENT DOCUMENTS

| | | | |
|---|---|---|---|
| JP | 5-38478 | | 2/1993 |
| JP | 8-103711 | | 4/1996 |
| WO | WO 99/55790 | | 11/1999 |
| WO | WO 9955790 | A1 * | 11/1999 |

* cited by examiner

DIE HAVING MULTIPLE ORIFICE SLOT

CROSS REFERENCE TO RELATED APPLICATIONS

This application is a divisional of U.S. application Ser. No. 10/217,715, filed Aug. 13, 2002, now U.S. Pat. No. 7,591,903, the disclosure of which is incorporated by reference in its entirety herein.

BACKGROUND OF INVENTION

The invention relates to coating and extruding dies. More specifically, the invention relates to the configuration of the coating or extruding orifices.

Coating and extruding dies with continuous slots are expensive to manufacture and set. Machining and setup costs of continuous slot fluid bearing dies are large. Maintaining a uniform feed slot is beneficial in that fluid exiting the slot maintains a continuous cross-sectional profile. In order to maintain uniformity of the feed slot in the cross-web direction, dies have to be large and require elaborate mounting setup to provide adequate structural support around the slot. "Cross-web" direction is generally defined as the width dimension of a substrate (typically a web of paper or polymeric material) translating with respect to the die. The "cross-web" direction is perpendicular to the direction of travel of the web with respect to the die. "Cross-web" direction may be used to explain a direction of the die, the coating on a web, an extrudate or the web itself.

Dies with multiple orifices provided a less expensive alternative to continuous slot dies. Multiple orifice dies had a number of openings that allow the fluid (e.g. liquid) to exit the die distribution chamber. In order to provide a continuous cross-sectional profile of the fluid, fluid translating through the die was merged using external lands or troughs after it passed through the orifices. For example, in fluid bearing dies, downstream of where the fluid exited the die, a portion of the die was used to merge individual fluid streams into a continuous fluid coating on a web (often referred to as a "smoothing land"). Typically, a downstream portion of the smoothing land ended with a sharp edge, used to prevent ribbing and gaps in the coating. The length of the smoothing land is normally measured in the downstream direction, from the orifices to the sharp edge. Other types of dies combined the streams using a "trough" which collected and merged the fluid inside the die before the fluid was coated. Examples of multiple orifices are illustrated and described in U.S. Pat. Nos. 3,149,949; 4,774,109; 5,045,358; and 4,371,571, all of which are incorporated by reference in their entirety, herein.

Because neighboring fluid streams from these previous multiple orifice type dies must be merged before coating (or extruding) on a web or other substrate in order to form a continuous cross-sectional profile of the fluid, previous dies of this type have somewhat narrow range of coating (or extrusion) parameters (e.g., line speed, die settings, desired thickness of coated (or extruded) film, die position, etc.) in order to provide a coated (or extruded) layer which is continuous, smooth, and bubble free. This is due to the techniques required to merge the separate fluid streams created by the adjacent orifices. Especially troublesome is the merging point of the two streams. Air often becomes entrained between the fluid and the substrate at that point, which can cause imperfections in the end product.

BRIEF SUMMARY OF THE INVENTION

The invention is a die for dispensing flowable material. The die is comprised of a die block. An external face is disposed on the die block. At least one slot extends perpendicularly into the external face. The slot has a longitudinal dimension, a first longitudinal side and a second longitudinal side. At least one support member extends from the external surface into the slot. The support member extends continuously from the first longitudinal side to the second longitudinal side. At least a portion of the support member is disposed in a direction other than perpendicular to the longitudinal dimension. The support member is disposed such that at least a portion of any plane extending from the first longitudinal side to the second longitudinal side, in a direction perpendicular to the longitudinal dimension of the slot, passes through a void area.

BRIEF DESCRIPTION OF THE DRAWINGS

In this disclosure, several devices are illustrated. Throughout the drawings, like reference numerals are used to indicate common features or components of those devices.

While the above-identified drawing figures set forth several preferred embodiments of the invention, other embodiments are also contemplated, as noted in the discussion. In all cases, this disclosure presents the invention by way of representation and not limitation. It should be understood that numerous other modification and embodiments can be devised by those skilled in the art which fall within the scope and spirit of the principle of the invention.

DETAILED DESCRIPTION

Figure 1:
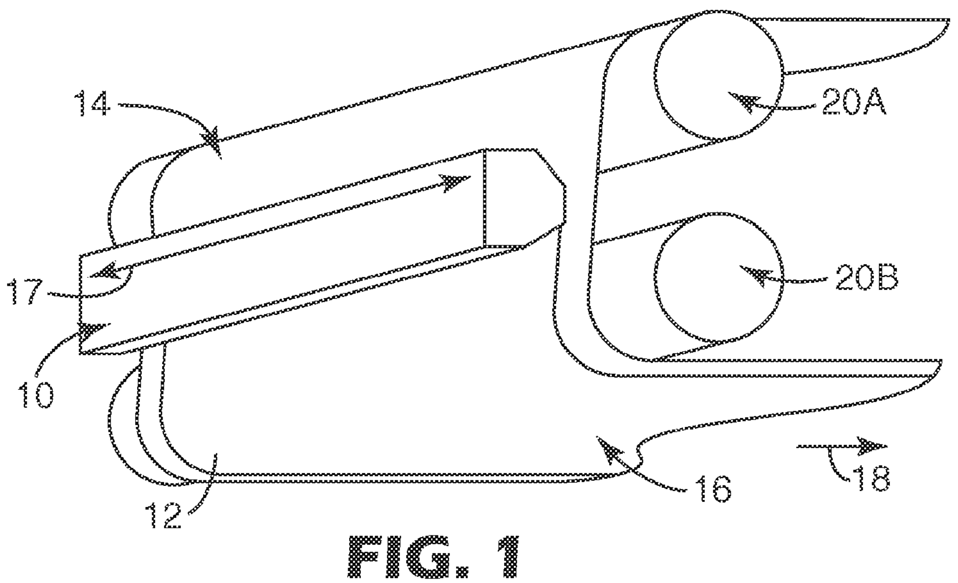
FIG. 1 is a perspective schematic view of one embodiment of the inventive die.

An exemplary die of the present invention is illustrated generally at 10 in FIG. 1. Die 10 is shown being used in a free span coating process where fluid 12 (i.e., a flowable material) is translated out onto web 14 so as to form coating 16. Longitudinal (or "cross web") direction of die 10 is indicated by arrow 17. Longitudinal direction 17 is perpendicular to the direction of travel of web 14 with respect to die 10. Web 14 can be formed of a multitude of various materials including polymers or paper. Web 14 is moving in the direction indicated by arrow 18 over directing rollers 20A and 20B. Roller 20A supports web 14 at a position upstream from die 10 and roller 20B supports web 14 at a position downstream from die 10, creating a "free span" of webbing material onto which die 10 applies fluid 12 as coating 16. While a free span fluid bearing coating process is illustrated, inventive die 10 may be utilized with many other types of coating and extruding processes, including fixed gap coating, curtain coating and slide coating, among others. Additionally, the shape of die 10 may vary according to the end user process and application.

Figure 2:
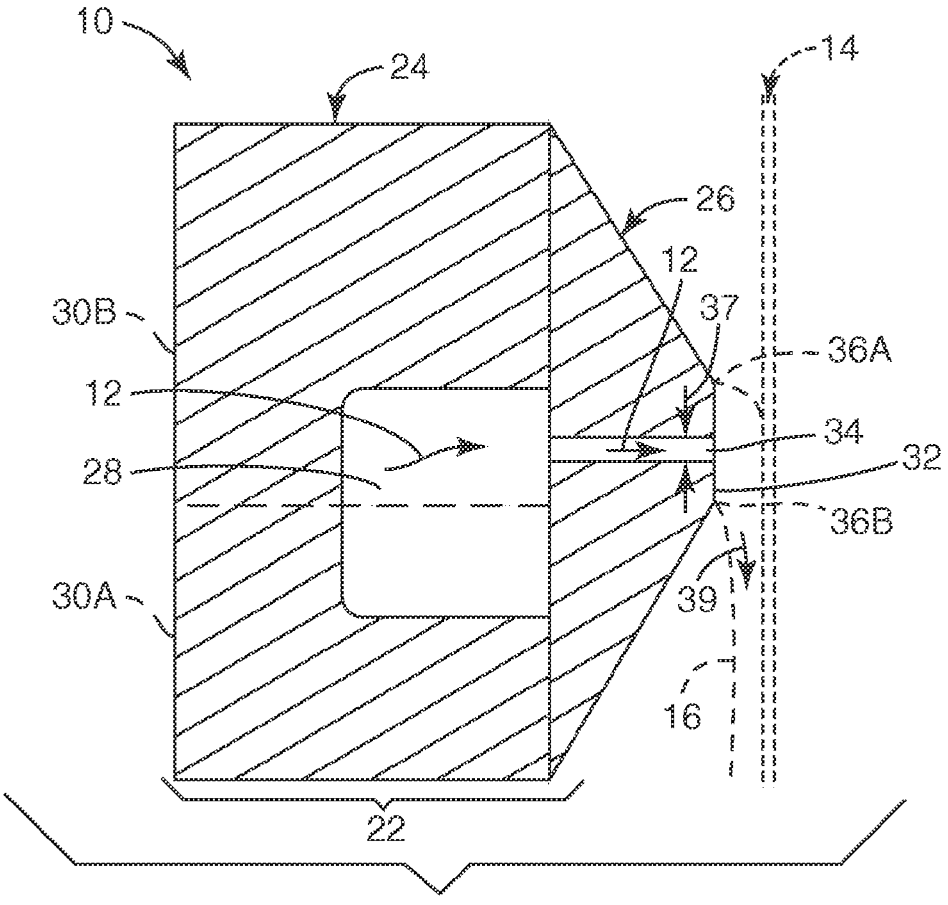
FIG. 2 is a cross sectional view of one embodiment of the inventive die.

A cross sectional view of one embodiment of inventive die 10 is illustrated in FIG. 2. Die 10 includes die block 22, which includes block portion 24 and faceplate portion 26. Manifold 28 is formed internally within block portion 24. While the illustrated die block 22 is formed of two pieces, any number of pieces may be used to form die block 22. For example, block portion 22 can be divided into first and second pieces 30A and 30B as indicated by dashed lines, (e.g., by bolting or clamping). When faceplate portion 26 of die 10 is formed separately from block portion 22, the use of different faceplate portion 26 on the same block portion 24 is enabled. Alternatively, block portion 24 and faceplate portion 26 can be formed of one integral piece of metal to form die block 22. External face 32 is disposed on faceplate portion 26 of die block 22. Slot 34 extends into external face 32 of faceplate portion 26 in communication with manifold 28.

Fluid material 12 is introduced into manifold 28, typically by a pump (not shown), such as an extruder or a positive displacement pump (e.g., a gear pump or metering pump (among others), as known in the art. Pressure in manifold 28 created by the pump forces fluid 12 out of slot 34. As fluid 12 emerges from slot 34 it wets external face 32 of faceplate portion 26 and forms first and second static lines 36A and 36B. A static line is known in the art and can be defined as the joining line of fluid 12, external face 32 and either the environment surrounding die 10 (typically air) or possibly another layer of fluid (e.g., in multiplayer coating dies). Static lines 36A, 36B form on die 10 on each side of slot 34 as defined by width dimension 37. Width dimension 37 of slot 34 is defined between edge 41A of the most upstream orifices 40B and edge 41B of the most downstream orifices 40A. See FIG. 3. Returning to FIG. 2, fluid material 12 flows in a direction generally parallel to external face 32 on faceplate portion 26. The direction is indicated generally by reference number 39. Die 10 may be disposed against web 14 (shown in dotted lines) such that fluid 12 forms coating (or film) 16 on web 14. Alternatively, die 10 may be used to extrude fluid 12 as a stand alone film such as in a casting type extrusion process, as known in the art. Additionally, multiple layers of fluid may be extruded or coated by die 10.

Figure 3:
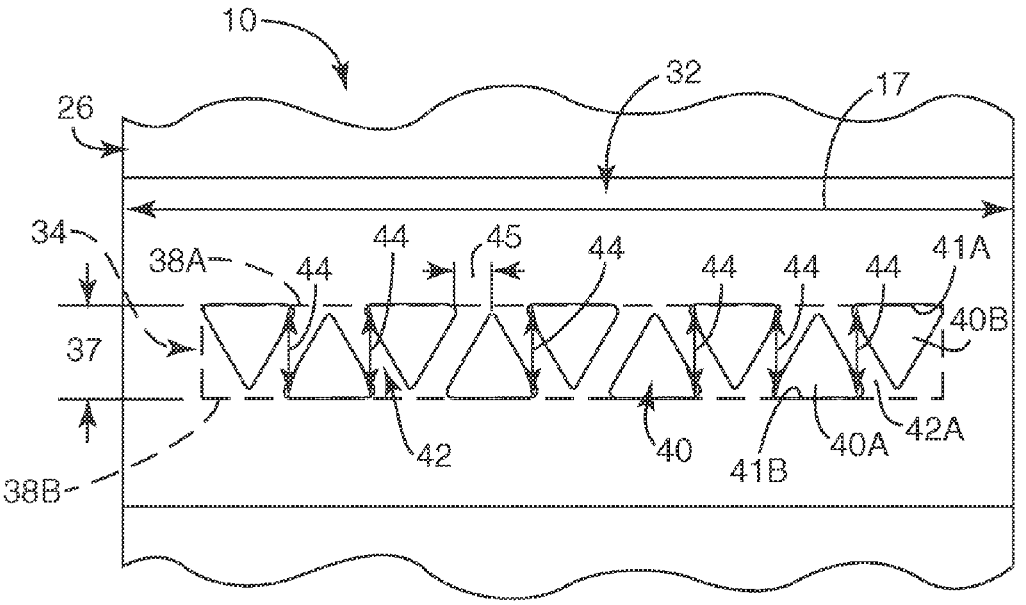
FIG. 3 is a partial front view of one embodiment of the inventive die.

FIG. 3 illustrates the first embodiment of external face 32 of inventive die 10. Slot 34 is shown extending in longitudinal dimension 17. Slot 34 has first longitudinal side 38A and second longitudinal side 38B indicated by dotted lines. A plurality of orifices (or void areas) 40 extend into external face 32 of faceplate portion 26. A plurality of support members 42 are disposed such that an individual support member 42A is between every adjacent orifice 40A and 40B. It should be noted that when orifices and support members are referred to generally, a reference number alone will be used (i.e., "orifices 40" and "support members 42") however, when a specific orifice or support member is referred to, a letter will be appended (i.e., "orifice 40A" and "support member 42A").

Support members 42 extend continuously from first longitudinal side 38A to second longitudinal side 38B of slot 34 in such a manner that at least a portion of any plane (indicated by arrows 44) disposed between first longitudinal side 38A and second longitudinal side 38B in a direction perpendicular to longitudinal (or cross web) dimension 17 passes through at least one orifice (or void) 40.

In the illustrated embodiment, support members 42 extend from first and second longitudinal sides 38A and 38B at an angle of about sixty degrees with respect to first and longitudinal and second longitudinal sides 38A and 38B. In one embodiment, the thickness (in the longitudinal direction 17) of each support member is less than or equal to about 5 mils (about 130 microns) (indicated by reference number 45), and slot width 37 is less than or equal to about 40 mils (about 1020 microns), although the size and width may vary according to the end application. Disposing support members 42 in this fashion forms orifices 40 which are generally shaped as equilateral triangles. While nine orifices 40 are illustrated, the number may vary according to the end application (e.g., the length of slot 34). The distance support members 42 extend from external face 32 into slot 34 can vary according to the end application.

Figure 3A:
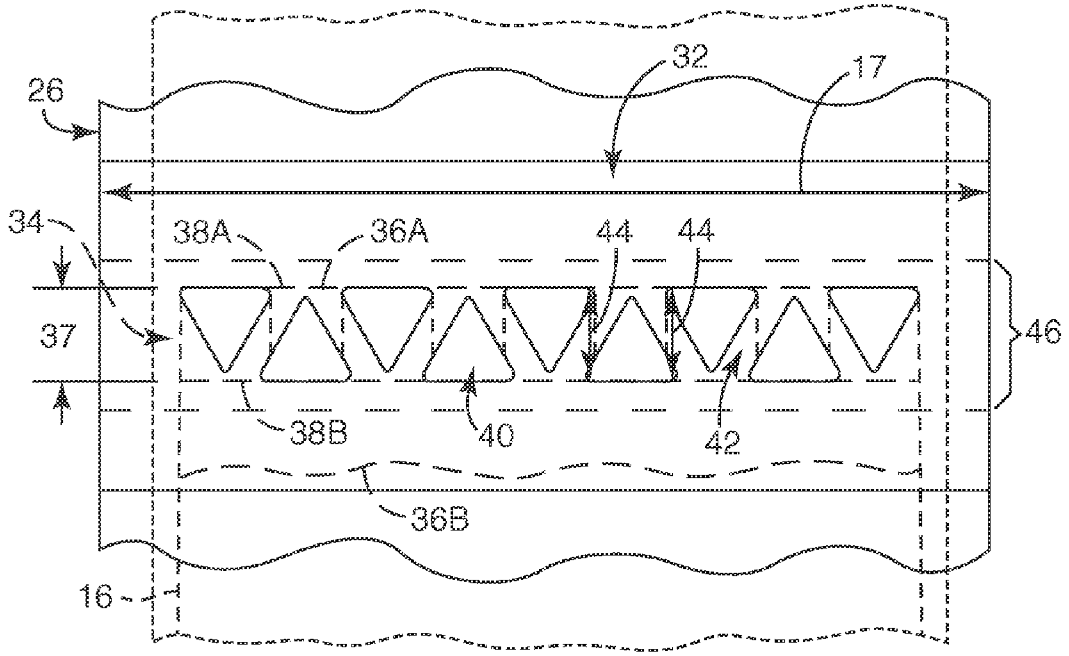
FIG. 3A is a partial front view of one embodiment of the inventive die.

Forming support members 42 in slot 34 can be accomplished in various ways contemplated by this application. For example, orifices 40 can be machined (e.g., bored) into external face 32, or formed as part of a shim or insert (indicated as optional by dotted lines 46 in FIG. 3A). Shim 46 may be used to define slot 34 in die block 22 and include support structures 42 and orifices 40 as described. When shim 46 (the general use of which is known) is used to contain supports 42 and orifices 40 in slot 34, it allows the configuration of slot 34 to be changed by removing shim 46 from die 10 and replacing with an alternate shim (not shown) having a different configuration of support members 42 and orifices 40, such as those described with respect to FIGS. 4, 5, 6, 7, and 8, below.

Support members 42 run continuously from first longitudinal side 38A to second longitudinal side 38B such that first and second longitudinal sides 38A and 38B are prevented from "bowing" in a convex or concave fashion, thereby deforming slot 34. "Bowing" occurs due to the pressure required to force fluid (e.g. liquid) 12 through die 10, and can vary according to the physical characteristics (e.g. viscosity) of the fluid 12. Some typical coating and extruding processes can generate from around 5 psi (around 34 kPa) of pressure to around 100 psi (around 690 kPa) of pressure on longitudinal sides 38A and 38B of slot 34. This level of pressure is resisted by support members 42.

The prevention of "bowing" provides for a high level of uniformity in the flow rate of fluid 12 exiting slot 34 (i.e., through orifices 40) across the die width. The overlapping of orifices 40 (exemplified by plane 44) in the direction of flow of fluid (e.g. liquid) 12 "overlaps" streams of fluid 12 as they exit orifices 40, thereby maintaining the cross-sectional continuity of the fluid film in the cross-web direction. In other words, gaps and bubbles are minimized such that a continuous layer (or film) of fluid is coated (or extruded) onto web 14 in the cross-web direction (i.e., in the longitudinal dimension 17 of die 10). This occurs since at each plane 44 along longitudinal dimension 17 of die 10, void or orifice 40 is emitting fluid 12. Thus, the benefits (e.g., preventing "bowing") of structure (i.e., support members 42) in slot 34 can be utilized while still emitting a continuous coating fluid layer 12. This "overlapping" is illustrated by dotted lines between orifices 40 showing fluid 12 on web 14. Overlapping minimizes the need to provide structure to join separate streams of fluid further downstream of slot 34, such as a smoothing land or a trough (i.e. a continuous groove extending into external surface 32). This allows the use of smaller dies which have the desired strength to withstand the pressure needed to force fluid 12 through die 10 while requiring minimal physical space.

First static line 36A is disposed proximate first longitudinal side 38A of slot 34. Second static line 36B is disposed proximate second longitudinal side 38B. It should be noted that the location of static lines 36A and 36B may vary as to the position on external face 32 according to the type of coating or extrusion being performed, and coating and extrusion settings among others. For example, first static line 36A may be disposed on a portion of support structures 42. It should also be noted that first static line 36A is disposed on external face 32 more proximate to first longitudinal side 38A than to second longitudinal side 38B. Additionally, second static line 36B is disposed on external face 32 more proximate to second longitudinal side 38B than to first longitudinal side 38A. Preferably the cross-sectional shape (i.e. taken in a plane generally parallel to external face 32) of each orifice 40 defined by support structure 42 extends substantially the entire slot width 37. In other words, the width of each orifice 40 (defined generally perpendicular to longitudinal direction 17) at external face 32 is substantially the same as slot width 37. This preferred configuration is exemplified particularly by the embodiments illustrated in FIGS. 3-4A and 6-8. Providing orifices 40 with widths substantially the same as slot 34 increases performance characteristics of inventive die 10, allowing higher coating speed and control of thickness of coating 16.

Figure 4:
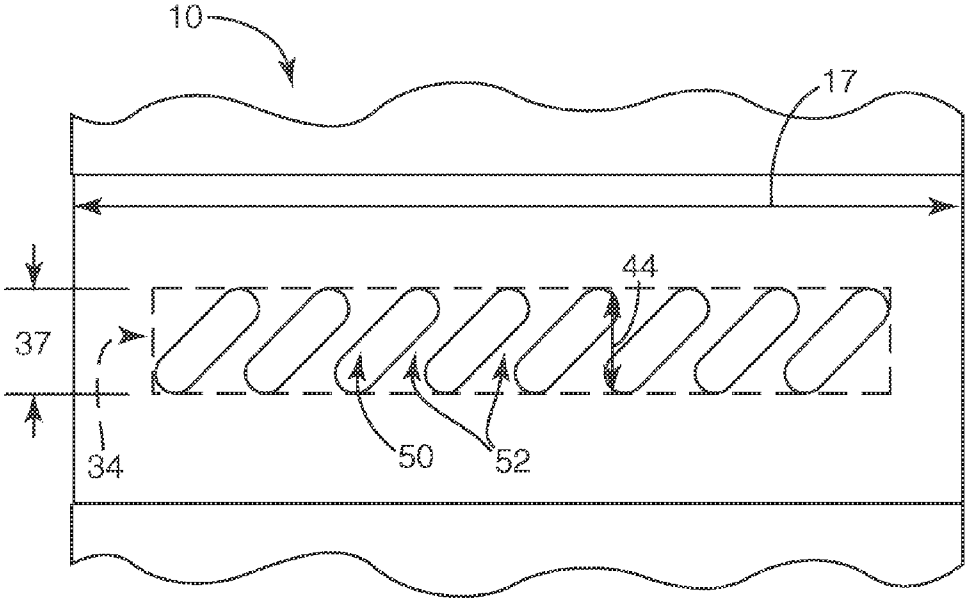
FIG. 4 is a partial front view of a second embodiment of the inventive die.
Figure 4A:
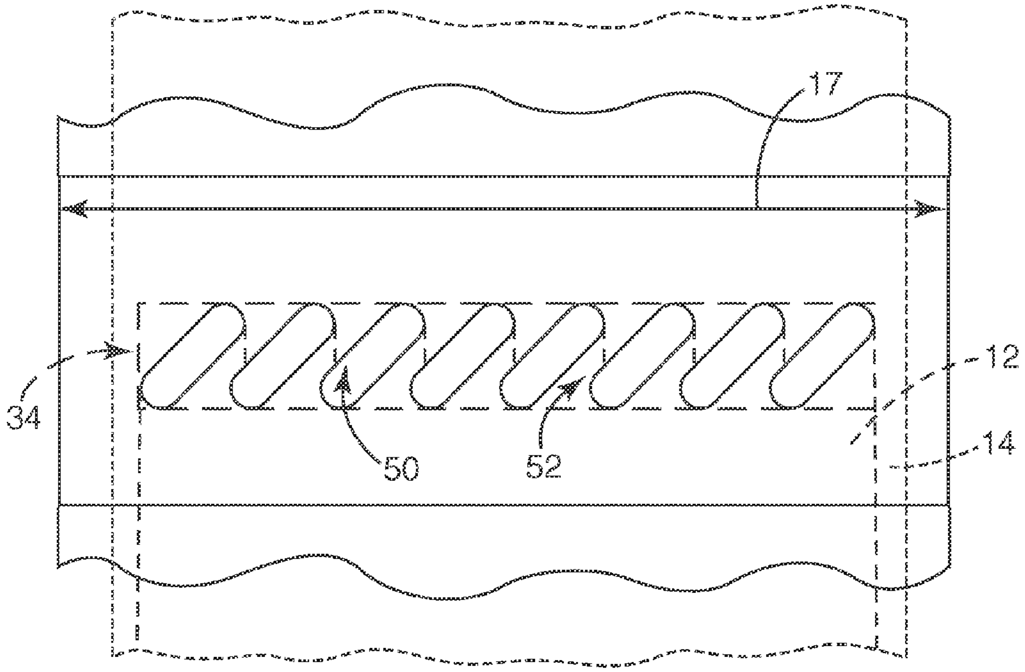
FIG. 4A is a partial front view of a second embodiment of the inventive die.

A second embodiment of inventive die 10 is illustrated in FIG. 4. In this embodiment, orifices 50 which are oval in cross-sectional shape are formed by diagonal support members 52. Support members 52 are configured such that planes 44 extending between first and second longitudinal sides 38A and 38B of slot 34 in a direction perpendicular to longitudinal dimension 17 or slot 34 pass through at least one orifice (or void) 50. Again, as illustrated by FIG. 4A, this provides an overlap of fluid 14 as it is expelled from orifices 50, creating a continuous cross-sectional profile in the cross-web direction. As discussed previously, the size and number of orifices 50 support members 52 (as with all embodiments described herein) can vary according to the end application.

Figure 5:
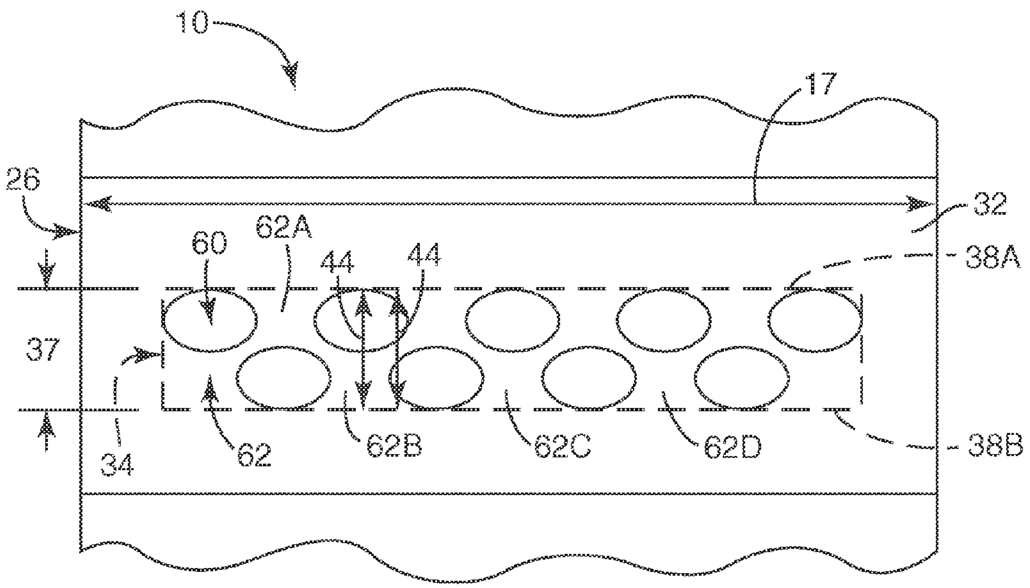
FIG. 5 is a partial front view of a third embodiment of the inventive die.

FIG. 5 illustrates a third embodiment of the inventive die 10. In this embodiment orifices 60 having an elliptical shape are disposed into external face 32 of faceplate portion 26. Support members 62 extend between orifices 60 providing structure which prevents slot 34 from "bowing". While not having a clearly linear shape, individual support members 62A, 62B, 62C and 62D are shaped to allow planes 44 disposed perpendicular to longitudinal sides 38A and 38B to pass through at least one orifice (or void) 60.

Figure 5A:
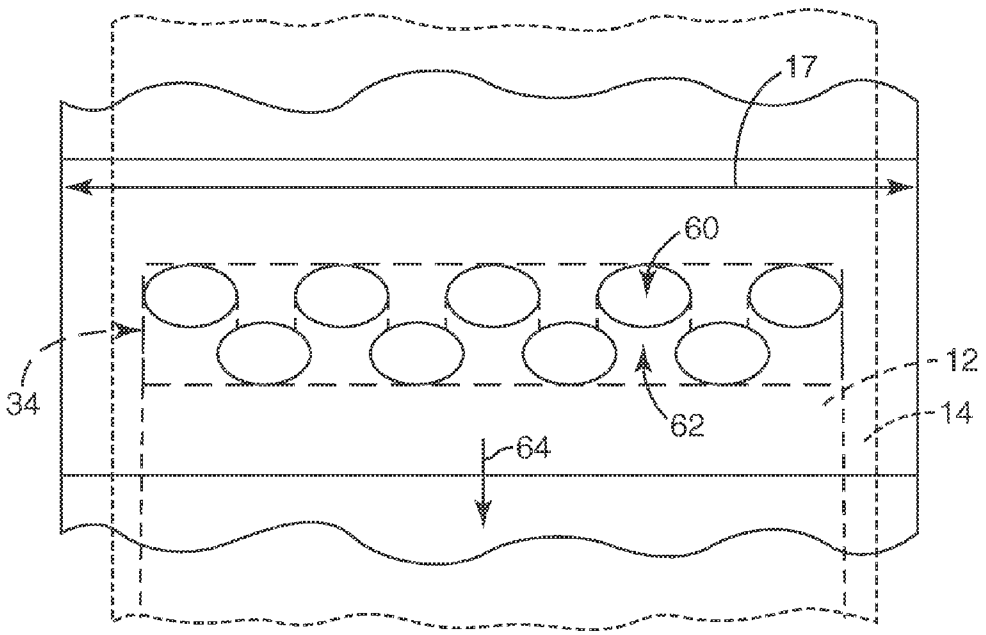
FIG. 5A is a partial front view of a third embodiment of the inventive die.

As illustrated in FIG. 5A, this allows fluid 12 translating through orifices 60 to "overlap" as it moves downstream (arrow 64) on web 14 from orifices 60, minimizing (preferably eliminating) air gaps and discontinuity in longitudinal dimension 17.

Figure 6:
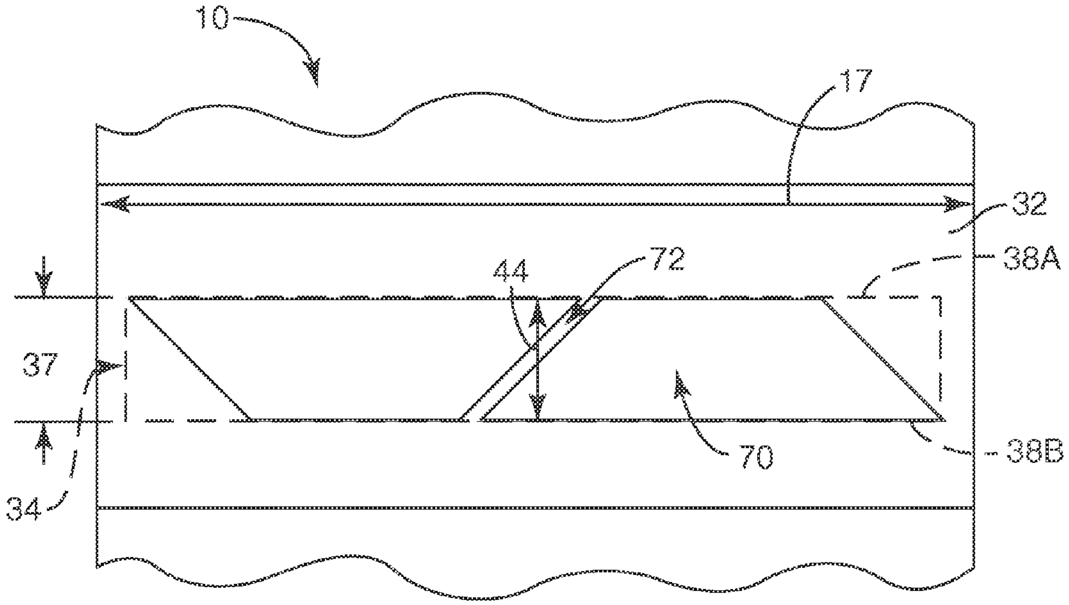
FIG. 6 is a partial front view of a fourth embodiment of the inventive die.
Figure 7:
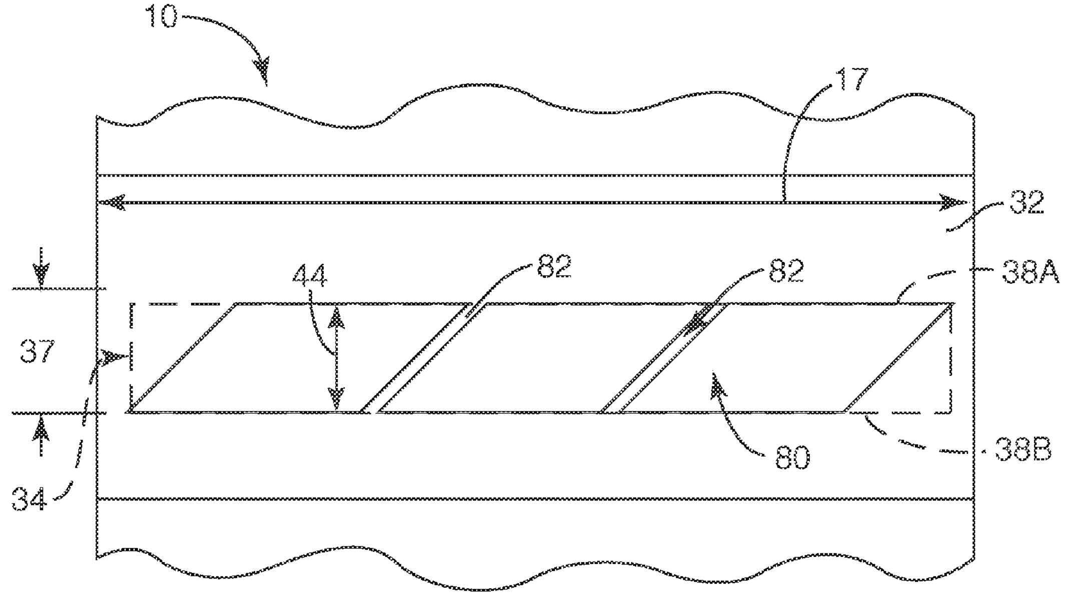
FIG. 7 is a partial front view of a fifth embodiment of the inventive die.
Figure 8:
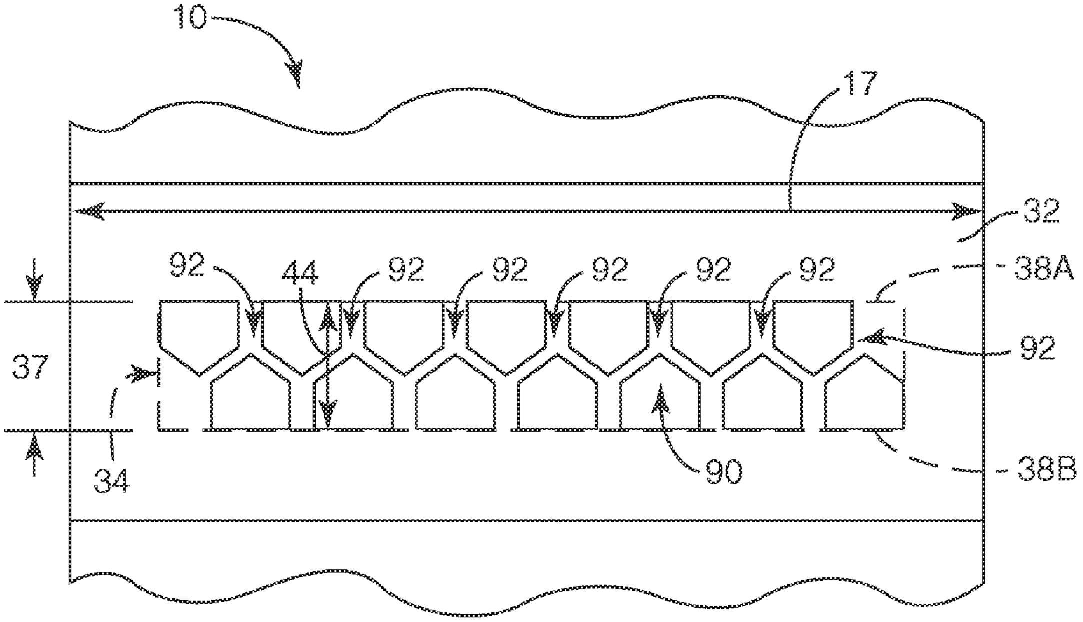
FIG. 8 is a partial front view of a sixth embodiment of the inventive die.
Figure 9B:
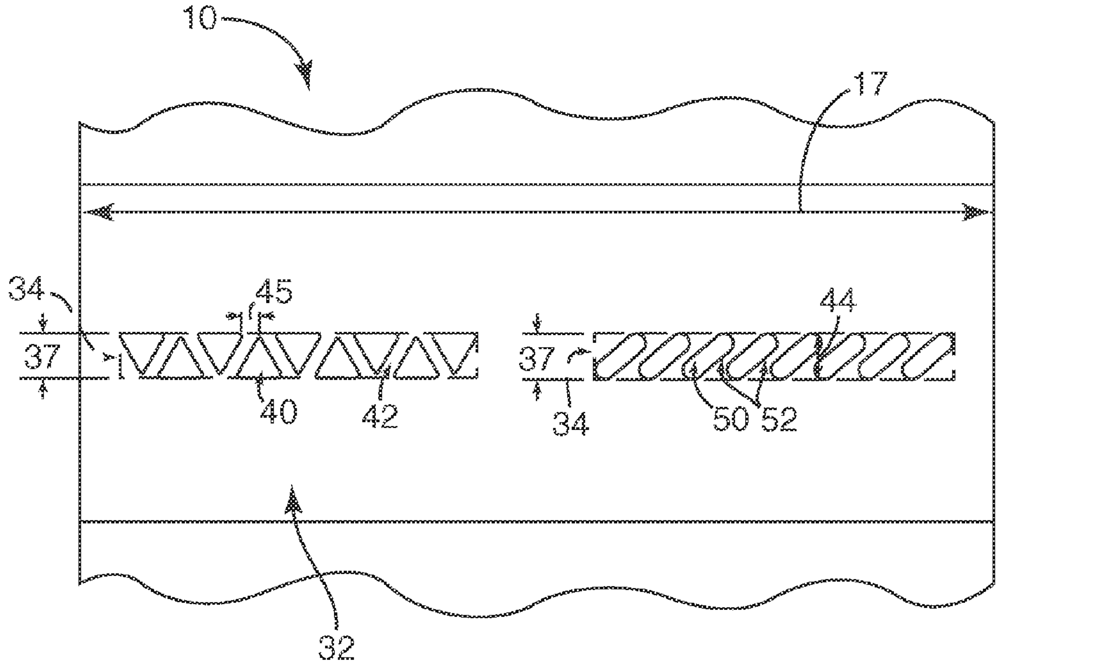
FIG. 9B is a partial front view of an eighth embodiment of the inventive die.
Figure 9A:
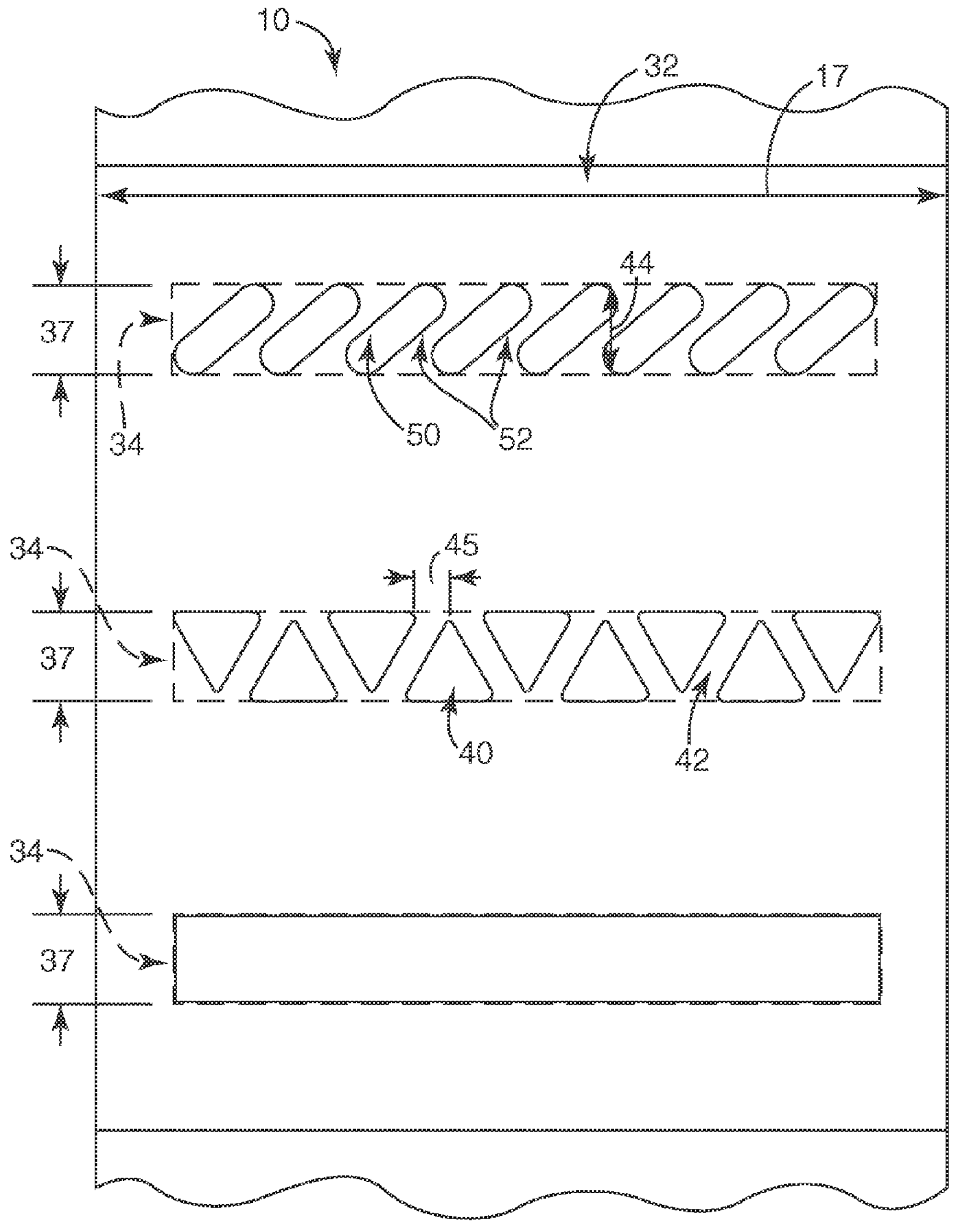
FIG. 9A is a partial front view of a seventh embodiment of the inventive die.

FIGS. 6-8 illustrate additional embodiments of inventive die 10. Specifically, FIG. 6 illustrates support member 72 which forms trapezoidal orifices (or voids) 70 into external face 32. FIG. 7 illustrates support members 82 which form parallelogram shaped orifices (or voids) 80 into external face 32. FIG. 8 illustrates support members 92 which form pentagonal shaped orifices (or voids) 90 into external face 32. In each of the embodiments illustrated by FIGS. 6-8, planes 44 can be defined which extend between first and second longitudinal sides 38A and 38B of slot 34 in a direction perpendicular to longitudinal dimension 17 of slot 34. Every plane 44 along the longitudinal dimension 17 of slot 34 extends through at least one orifice (or void) (indicated in FIGS. 6, 7 and 8 by reference numbers 70, 80 and 90, respectively). Any number of support structures 72, 82, 92 and orifices 70, 80 and 90 may be utilized in the inventive die without departing from the spirit and scope of the invention. This is reflected by small deviation from straightness in longitudinal direction 17 and additional stability of static line 36B across the external face 32. It should be noted that in one embodiment as illustrated in FIG. 9B, multiple slots 34 extending partially along the longitudinal dimension 17 of external face 32 may be used. These multiple slots 34 include orifices (shown by reference numbers) 40 and 50 separated by support structure 42 and 52. Additionally, any combination or number of rows (e.g., multiple film layers) and as well as any number and any shape of orifices may be used in combination in the inventive die. For example, as illustrated in FIG. 9A three slots 34 could be "stacked", creating three film layers. Each slot 34 could have different orifice shapes (as illustrated) including a continuous slot without support structures. Alternatively, the orifice shape can vary internally in each slot.

Although the present invention has been described with reference to preferred embodiments, workers skilled in the art will recognize that changes may be made in form and detail without departing from the spirit and scope of the invention.

What is claimed is:

1. A method for dispensing flowable material through a die comprising:

providing a source of flowable material;

providing a die block, the die block including:

an external face disposed on the die block, at least one slot extending perpendicularly into the external face and having a longitudinal dimension, a first longitudinal side and a second longitudinal side, the at least one slot comprising a single row of at least two unconnected voids, wherein each slot extends longitudinally across only a portion of the external face, at least one support member extending from the external face into the slot, each support member extending continuously from the first longitudinal side to the second longitudinal side between two of the voids, wherein at least a portion of each support member is disposed in a direction other than perpendicular to the longitudinal dimension, such that at least a portion of any plane extending from the first longitudinal side to the second longitudinal side, in a direction perpendicular to the longitudinal dimension of the slot, passes through at least one of the voids, and further wherein a portion of any line extending through any void in the row in a direction parallel to the longitudinal dimension of the slot passes through every void in the row; and translating the flowable material through the at least one slot while maintaining continuity of the flowable material along the longitudinal dimension of the slot.

2. The method of claim 1 further comprising:

translating the flowable material along the external face after the step of translating the flowable material through the at least one slot.

3. The method of claim 1 further comprising:

at least one manifold in fluid communication with the at least one slot, wherein the flowable material is translated from the source of flowable material into the manifold, and further wherein the flowable material is translated from the manifold through the slot.

4. The method of claim 1 further comprising:

forming a static contact line of the flowable material on one of the external face and the at least one support member more proximate the first longitudinal side than the second longitudinal side; and forming a static contact line of the flowable material on the external face more proximate the second longitudinal side than the first longitudinal side.

5. The method of claim 1 and further comprising:

coating the flowable material onto a substrate.

6. The method of claim 1 and further comprising:

forming a film with the flowable material.

7. A method for dispensing flowable material through a die comprising:

providing a source of flowable material;

providing a die block, the die block including:

at least one die block having an external face, and a slot having a longitudinal dimension disposed in the external face of the die between a first longitudinal side and a second longitudinal side, wherein the external face extends between the first longitudinal side and the second longitudinal side, and wherein the slot extends longitudinally across only a portion of the external face, at least one array of unconnected orifices extending into the external face so as to define a longitudinal array dimension parallel to the external face, and a width perpendicular to the longitudinal array dimension and parallel to the external face, wherein a portion of any line extending through any orifice in the array in a direction parallel to the longitudinal dimension of the slot passes through every orifice in the array, wherein the orifices in the array are disposed such that at least a portion of each orifice is disposed at every width along the longitudinal array dimension of the array of orifices; and translating the flowable material through the slot and the at least one array of unconnected orifices while maintaining continuity of the flowable material along the longitudinal dimension of the slot.

8. The method of claim 7 further comprising:

translating the flowable material along the external face after the step of translating the flowable material through the slot and the at least one array of unconnected orifices.

9. The method of claim 7 further comprising:

at least one manifold in fluid communication with the slot and the at least one array of unconnected orifices, wherein the flowable material is translated from the source of flowable material into the manifold, and further wherein the flowable material is translated from the manifold through the slot and the at least one array of unconnected orifices.

10. The method of claim 7 further comprising:

forming a static contact line of the flowable material on the external face more proximate the first longitudinal side than the second longitudinal side; and forming a static contact line of the flowable material on the external face more proximate the second longitudinal side than the first longitudinal side.

11. The method of claim 7 and further comprising:

coating the flowable material onto a substrate.

12. The method of claim 7 and further comprising:

forming a film with the flowable material.

* * * * *